(12) United States Patent
Kita et al.

(10) Patent No.: US 6,884,957 B2
(45) Date of Patent: Apr. 26, 2005

(54) WIRE ELECTRIC DISCHARGE MACHINE

(75) Inventors: Yuki Kita, Yamanashi (JP); Yushi Takayama, Yamanashi (JP)

(73) Assignee: Fanuc Limited, Yamanashi (JP)

( * ) Notice: Subject to any disclaimer, the term of this patent is extended or adjusted under 35 U.S.C. 154(b) by 38 days.

(21) Appl. No.: 10/834,888

(22) Filed: Apr. 30, 2004

(65) Prior Publication Data

US 2004/0217089 A1 Nov. 4, 2004

(30) Foreign Application Priority Data

May 2, 2003 (JP) ........................................ 2003/127148

(51) Int. Cl.[7] ................................................. B23H 7/02
(52) U.S. Cl. .................................................... 219/69.12
(58) Field of Search ........................ 219/69.12; 269/13, 269/14, 15

(56) References Cited

U.S. PATENT DOCUMENTS 4,752,665 A * 6/1988 del Santo ................ 219/69.12
6,642,468 B1   11/2003 Kita et al.

FOREIGN PATENT DOCUMENTS

| EP | 1 238 739 A2 | 9/2002 |
| JP | 2-311219 A | * 12/1990 |
| JP | 6-55354 A | * 3/1994 |
| JP | 2002-263958 | 9/2002 |

* cited by examiner

Primary Examiner—Geoffrey S. Evans
(74) Attorney, Agent, or Firm—Staas & Halsey LLP

(57) ABSTRACT

A wire electric discharge machine having a simple mechanism for retracting and collecting a cutoff piece (machined chip or machined product). A cutoff piece receiving basket for receiving a cutoff piece produced during machining is attached to a support bar mounted to a lower guide block, the basket being rotatably supported by a rotary support shaft. A bearing provided in the support bar is located immediately short of a cam block, and then fitted into a slot by X-axis movement. A moment is applied to the support bar by Y-axis movement to rotate the cutoff piece receiving basket around the rotary support shaft, so that the basket is retreated to above a cutoff piece collecting box and then turned over, whereby a cutoff piece received in the basket falls into the collecting box. The cutoff piece receiving basket may be rotated manually or rotated by use of a robot, a special-purpose motor, an air cylinder, etc.

12 Claims, 9 Drawing Sheets

WIRE ELECTRIC DISCHARGE MACHINE

BACKGROUND OF THE INVENTION

1. Field of the Invention

The present invention relates to a wire electric discharge machine, and more particularly, to a wire electric discharge machine including a mechanism for collecting a cutoff piece (machined chip or machined product) that is produced by wire-electric discharge machining.

2. Description of Related Art

In machining a workpiece by use of a wire electric discharge machine, machined chips are usually produced as a cutoff piece. Machined chips produced by the wire electric discharge machining are different in form from those produced by other cutting machines. Depending on cases, a cutoff piece is utilized as machined product. Specifically, as depicted in FIG. 1, a lumped portion which is large in size is separated as a cutoff piece 2 from a workpiece 1. The lumped portion constitutes most part of machined chips or constitutes a machined product.

Such a cutoff piece falls into a machining tank. Since a lower arm, lower guide, etc. are disposed in the machining tank, the cutoff piece will likely to interfere with the lower arm, lower guide, etc., if it is left fallen in the tank. To obviate this, machined chips (or a machined product) are removed or collected manually by an operator immediately after being cut off from a workpiece. Also, there has been proposed a method for automatically collecting machined chips or machined products (see, JP2002-263958A), as a part of a robot-based system for automatically loading/unloading workpieces that has been developed to meet the demand of automated wire electric discharge machines.

SUMMARY OF THE INVENTION

The present invention provides a wire electric discharge machine having a mechanism for retracting a cutoff piece (machined chip or machined product) from a position where it can interfere with a lower arm, lower guide, etc., and for collecting the cutoff piece, which mechanism is simple and easy to perform an automated retracting operation.

According to the present invention, there is provided a mechanism which includes a cutoff piece receiving basket provided at a lower guide for receiving a cutoff piece (machined chip or machined product), and which causes a turning motion of the receiving basket to retract the cutoff piece received in the receiving basket to a safety place.

The wire electric discharge machine of the present invention performs electric discharge machining by electric discharge between a wire electrode and a workpiece. According to an aspect of the present invention, the wire electric discharge machine comprises: a lower guide arranged below the workpiece for guiding the wire electrode; a cutoff piece receiving basket provided at the lower guide for receiving a cutoff piece produced by the electric discharge machining; supporting means for pivotally supporting the cutoff piece receiving basket around a horizontal axis; turning means for turning the cutoff piece receiving basket supported by the supporting means around the horizontal axis; and a cutoff piece collecting box for receiving and collecting the cutoff piece displaced from the cutoff piece receiving basket by the turning of the cutoff piece receiving basket by the turning means.

The turning means may include driving means for moving the workpiece placed in a machining tank relative to the wire electrode.

In this case, the turning means may include a cam block fixed to the machining tank and the supporting means may include a support member for supporting the cutoff piece receiving basket and having one end to be engaged with the cam block, and the cam block is moved relative to the lower guide to be engaged with the one end of the support member and moved toward or away from the lower guide by the driving means, so that the cutoff piece receiving basket is turned around the horizontal axis.

The turning means may include a motor or a rotary actuator. Further, the turning means may include an air cylinder.

According to another aspect of the present invention, the wire electric discharge machine comprises: a lower guide arranged below the workpiece for guiding the wire electrode; a cutoff piece receiving basket provided at the lower guide for receiving a cutoff piece produced by the electric discharge machining; supporting means for pivotally supporting the cutoff piece receiving basket around a horizontal axis; a rotary operating member for receiving a moment to turn the cutoff piece receiving basket around the horizontal axis; and a cutoff piece collecting box for receiving and collecting the cutoff piece displaced from the cutoff piece receiving basket by the turning of the rotary operating member by the moment applied to the rotary operating member.

The moment to turn the rotary operating member may be manually applied, or applied by a tool attached to a robot.

Typically, the cutoff piece is a machined chip produced during the wire electric discharge machining. However, the cutoff piece may be a machined product.

DETAILED DESCRIPTION

Figure 1:
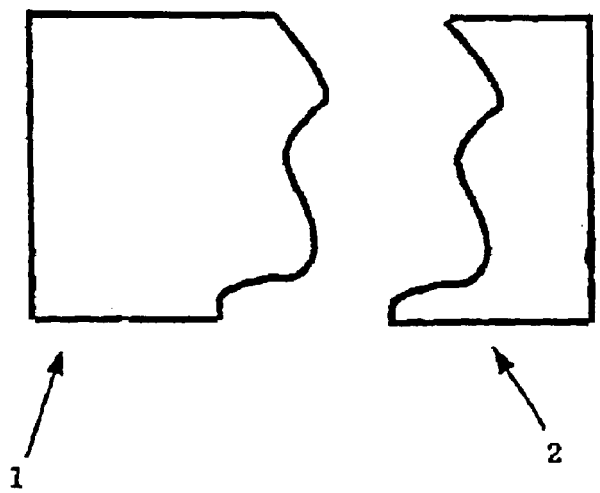
FIG. 1 is a schematic view for explaining a cutoff piece produced by wire electric discharge machining.
Figure 6:
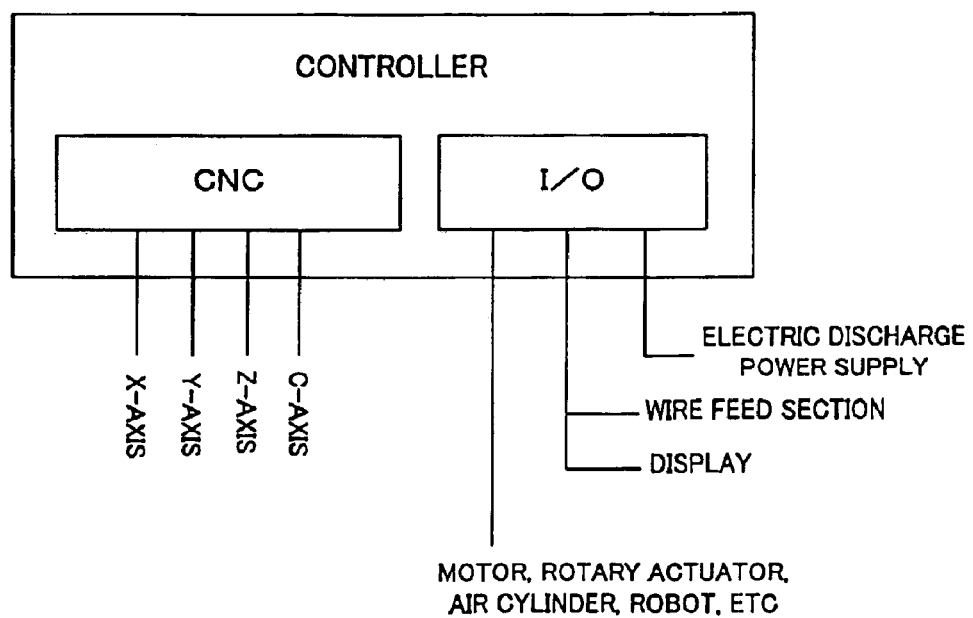
FIG. 6 is a block diagram showing connection of a CNC/controller of an electrical equipment section with a rotary axis (C-axis), X, Y and Z axes, external devices, etc.
Figure 2:
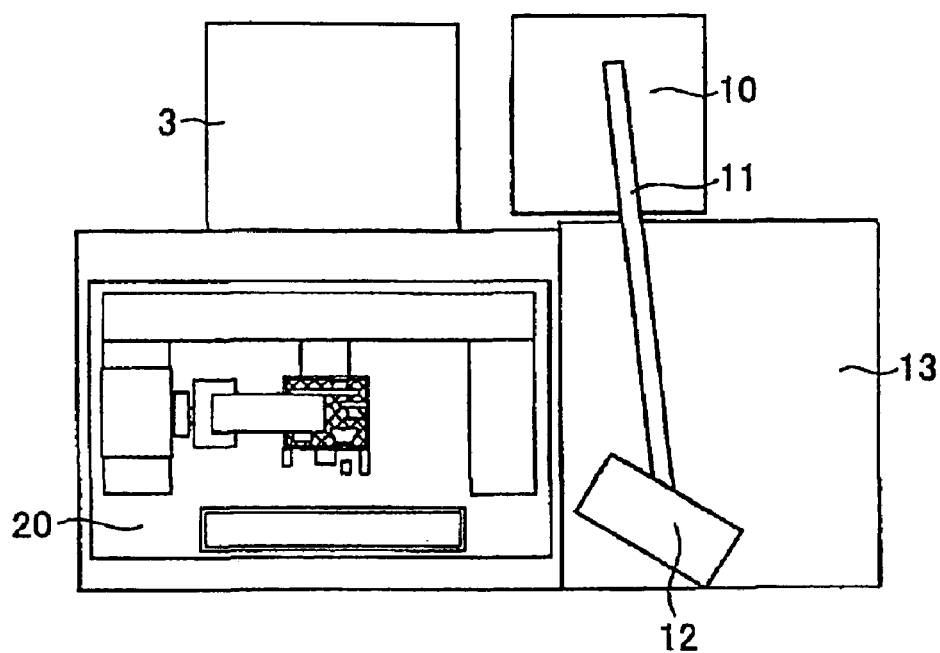
FIG. 2 is a top view for explaining the overall arrangement, as seen from above, of a wire electric discharge machine according to an embodiment of this invention.
Figure 3:
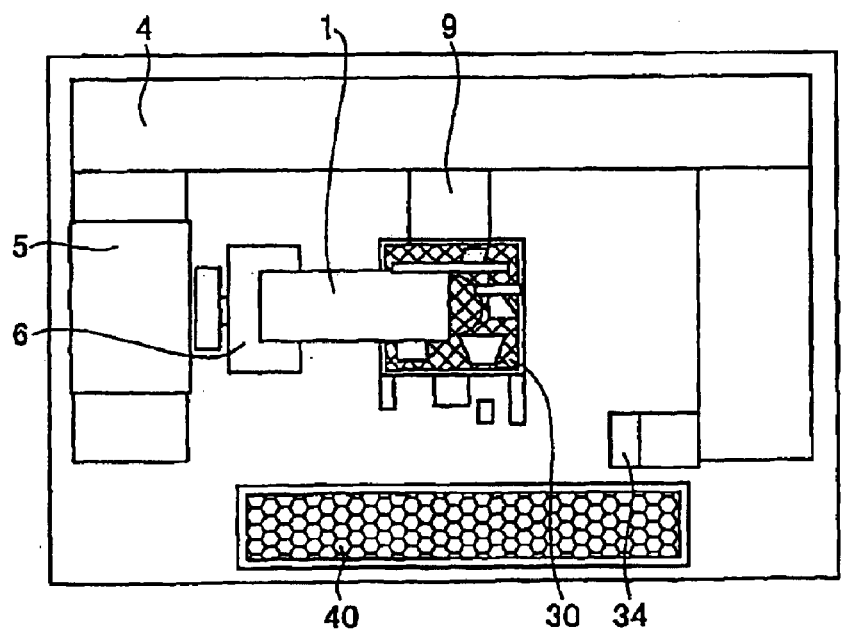
FIG. 3 is a top view showing from above a schematic arrangement inside a machining tank of the wire electric discharge machine shown in FIG. 2.
Figure 4:
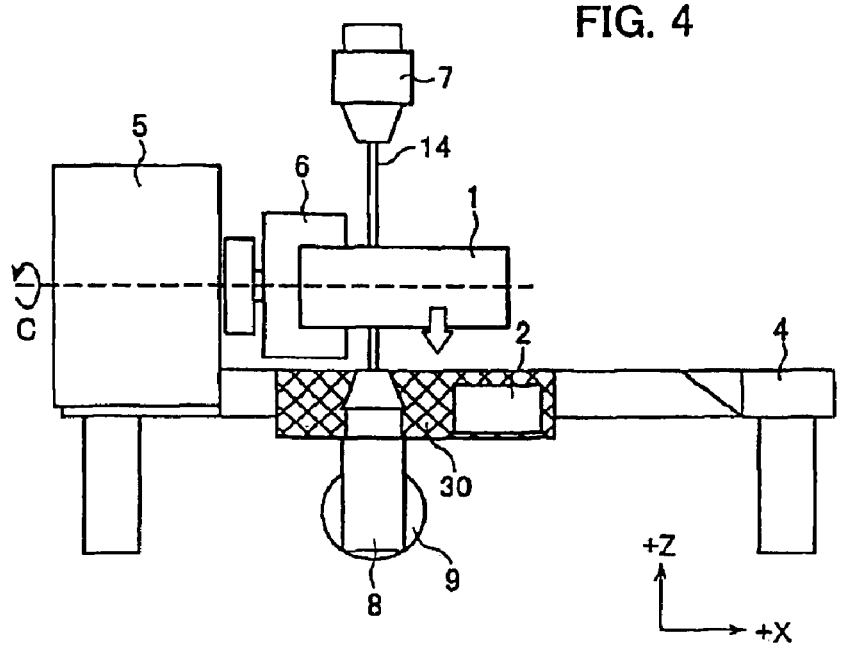
FIG. 4 is a front view for explaining a schematic arrangement in the machining tank of the wire electric discharge machine according to the embodiment.

With reference to FIGS. 2–6, the outline of a wire electric discharge machine of an embodiment of this invention will be first explained. The wire electric discharge machine of this embodiment includes machining-related parts which are the same in construction as conventional ones. Specifically, reference numeral 3 denotes a column that supports an upper guide block 7 and the like. A wire 14 is fed from the upper guide block 7 to a lower guide block 8 supported by a lower arm 9 fixed to the column 3, and is wound into a wire takeup unit (not shown) disposed at a rear face of the column 3.

Machining fluid is supplied from a machining fluid tank 13 to a machining tank 20. Machining is carried out in a state that a workpiece 1 and the lower guide block 8 and the like positioned below the workpiece 1 are immersed in the machining fluid. Alternatively, the machining may be performed with the workpiece 1 and the lower guide block 8 and the like flushed with machining fluid. The workpiece 1 in the machining fluid undergoes electric discharge machining with the wire 14, while being held by a workpiece holder 6 which is rotatable around a horizontal axis (C-axis) by a rotary driving unit 5.

A controller is installed in an electrical equipment section 10 as conventionally known, which controller includes a CPU, a CNC, a memory, and an input/output device (for external devices). The CNC controls servomotors for driving the X, Y, Z and C axes. The input/output device (I/O) is connected to an electric discharge power supply, a wire feed section, and a display (denoted by reference numeral 12 in FIG. 2), and if necessary is connected to a motor (other than the axis servomotors), a rotary actuator, an air cylinder, a robot, etc. so that required command and data are transferred in between.

Wire electric discharge machining is performed in a known manner. In brief, the X, Y and C-axis positions are servo-controlled by the CNC in accordance with a machining program stored in the memory of the controller, and a predetermined electric discharge voltage/current is supplied to the wire 14, whereby the workpiece 1 is machined along predetermined cutting lines and cutting planes. As a result, a cutoff piece 2 is produced. Various data indicating progress of machining, etc. are displayed on a display 12 mounted on a display support stand 11.

The cutoff piece 2 produced as a result of machining is a machined chip or a machined product. In either case, the cutoff piece 2 falls into the cutoff piece receiving basket 30. In accordance with a feature of this invention, the cutoff piece receiving basket 30 is pivotally supported for turning around a horizontal axis and makes a rotary motion to assume a turnover position, to thereby cause the received cutoff piece 2 to be displaced from the cutoff piece receiving basket 30 and retracted from the vicinity of the lower guide block 8 and then transferred into a cutoff piece collecting box 40. A mechanism therefor and its operation will be described hereinbelow.

Figure 5:
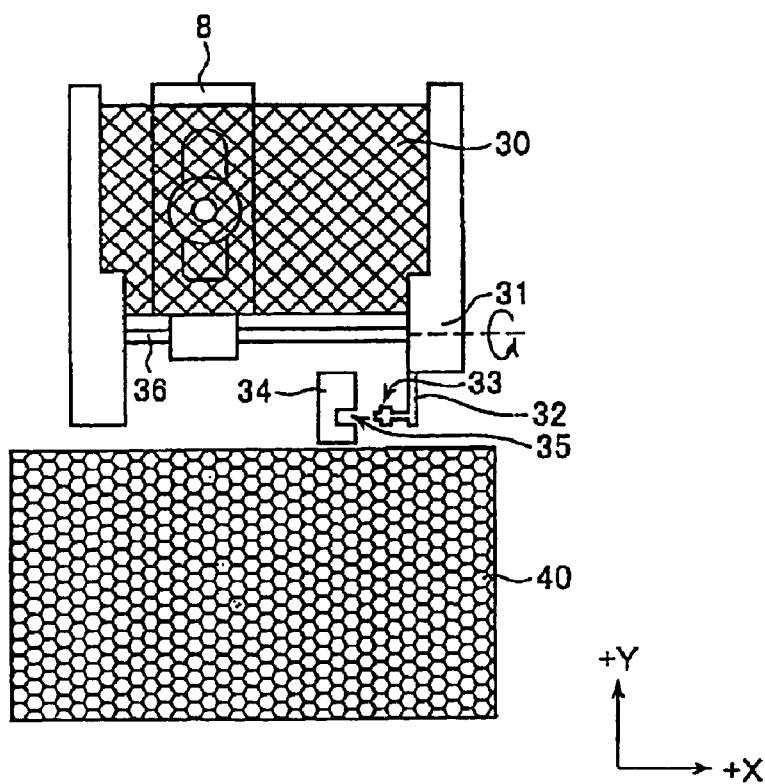
FIG. 5 is a top view for explaining a schematic arrangement around a lower guide section of the wire electric discharge machine according to the embodiment.

As shown in FIG. 5, the cutoff piece receiving basket 30 is mounted to and supported by support bars (support members) 31 to which a rotary support shaft 36 is coupled. The rotary support shaft 36 is supported by the lower guide block 8 via bearings (not shown). Ordinarily (i.e., during a time period in which the latter-mentioned operation for retraction of cutout material is not performed), the cutoff piece receiving basket 30 and the support bars 31 supported for rotation by the rotary support shaft 36 are kept stationary and placed under their own weights on the lower guide block 8. A fallen cutoff piece 2, if any, is received in the cutoff piece receiving basket 30.

One of the support bars 31 has an extension portion 32 extending away from the rotary support shaft 36. The extension portion 32 serves as a lever (operating pole) for rotating, around the rotary support shaft 36, the support bars 31 and the cutoff piece receiving basket 30 supported by the support bars 31. By applying a moment acting around the rotary support shaft 36 to the extension portion 32, the cutoff piece receiving basket 30 is turned around the rotary support shaft 36.

Adopted as moment application means in this embodiment is a mechanism which converts a drive force for an XY table 4 into a moment acting around the rotary support shaft 36 and which applies the moment to the vicinity of a distal end of the extension portion 32. Specifically, a bearing 33 is provided in the vicinity of the distal end of the extension portion 32 so as to slightly project laterally (in the axial direction of the rotary support shaft 36), and a cam block 34 is provided which is formed with a slot (guide groove) 35 into which the bearing 33 is fittedly received.

The cutoff piece collecting box 40 having an opening directed upward (in the positive Z direction) is disposed nearly symmetrical with the cutoff piece receiving basket 30 with respect to the rotary support shaft 36. In this embodiment, the cutoff piece collecting box 40 is disposed within the machining tank 20. In some cases, the cutoff piece collecting box 40 may be disposed outside the machining tank 20. The cam block 34 is fixed to the machining tank 20 at a location near the cutout-material collecting box 40 (illustration of the fixed portion is omitted), and therefore, positional relations between the cutout-material receiving basket 30 placed stationary on the lower guide block 8 and the cam block 34 and between the basket 30 and the slot 35 formed in the cam block 34 are determined depending on the moving position of the XY table 4.

In this embodiment, the cam block 34 is positioned in such a manner that the extension portion 32 and bearing 33 of the support bar 31 are not close to the cam block 34 when the XY table 4 is within its intended moving range during ordinary electric discharge machining of the workpiece 1. Thus, no moment is applied to the extension portion 32 and the bearing 33 as the workpiece 1 undergoes ordinary electric discharge machining, and therefore, the cutoff piece receiving basket 30 is kept stationary on the lower guide block 8 and ready to receive a fallen cutoff piece 2, as mentioned above.

The following is an explanation of operations for retraction and collection (transfer to the cutoff piece collecting box 40) of cutoff piece, which are effected by use of the aforementioned rotary mechanism.

By rotating the cutoff piece receiving basket 30 around the rotary support shaft 36, the cutoff piece 2 is moved away from the vicinity of the lower guide block 8 together with the cutoff piece receiving basket 30, thereby achieving retraction of the cutoff piece 2. The cutoff piece receiving basket 30 is further rotated, and then turned over so that its opening is directed downward above the cutoff piece collecting box 40, whereby the cutoff piece 2 can be transferred to the cutoff piece collecting box 40.

In order to rotate the cutoff piece receiving basket 30 around the rotary support shaft 36, the bearing 33 is moved to the position facing the slot 35 immediately short of the cam block 34, as shown in FIG. 5, using the drive axes of the XY table. For convenience of explanation, such XY position (measured along the X and Y axes (ditto in the following)) will be referred to as "retraction-ready position." From this retraction-ready position, the bearing 33 is moved by a predetermined distance in the negative X-direction so as to be fitted into the slot 35. The XY position assumed upon completion of the bearing fitting is also a position to which the X and Y axes are restored after the retraction/collection is completed. For convenience of explanation, such position will be referred to as "retraction start/completion position."

Figure 7:
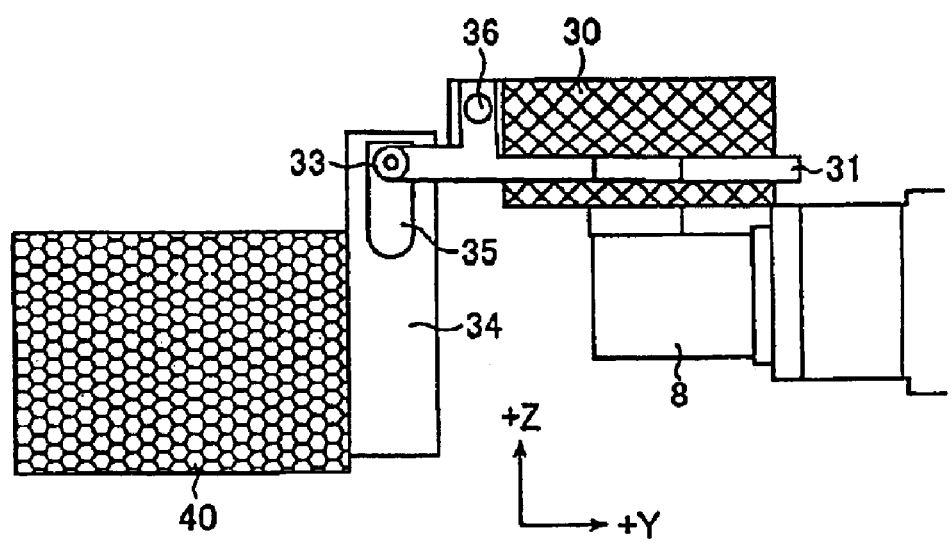
FIG. 7 is a view for explaining a state where a cutoff piece receiving basket is at a retraction start/completion position.

FIG. 7 shows a state where the XY position is at the retraction start/completion position. Specifically, with the movement from the retraction-ready position to the retraction start/completion position (the movement in the negative X-direction), the bearing 33 is moved by a predetermined distance (distance between the retraction-ready position and the retraction start/completion position) in the direction from the front of the paper to the back in FIG. 7, to assume the position fitted into the slot 35 of the cam block 34. In this state, the cutoff piece receiving basket 30 is of course still placed stationary on the lower guide 8 through the support bars 31.

Figure 8A:
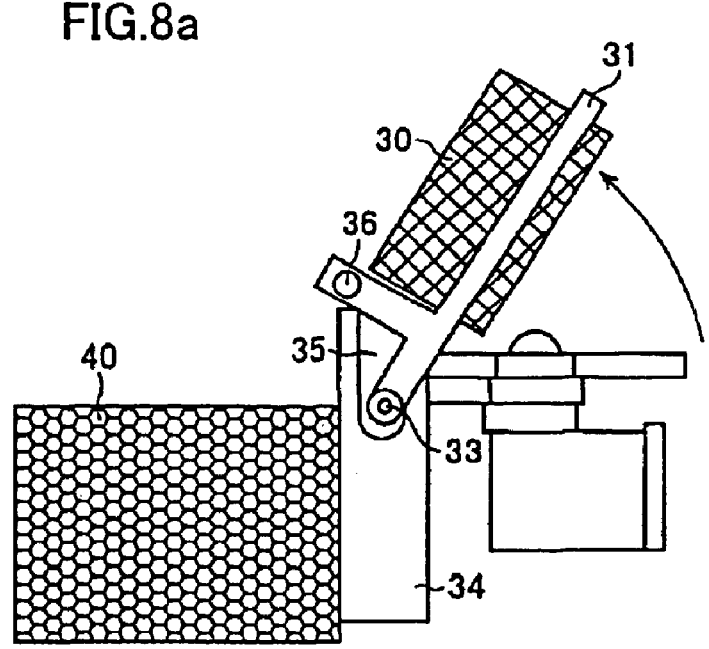
FIG. 8a is a view showing a state where the basket is rotated by about 60 degrees.
Figure 8B:
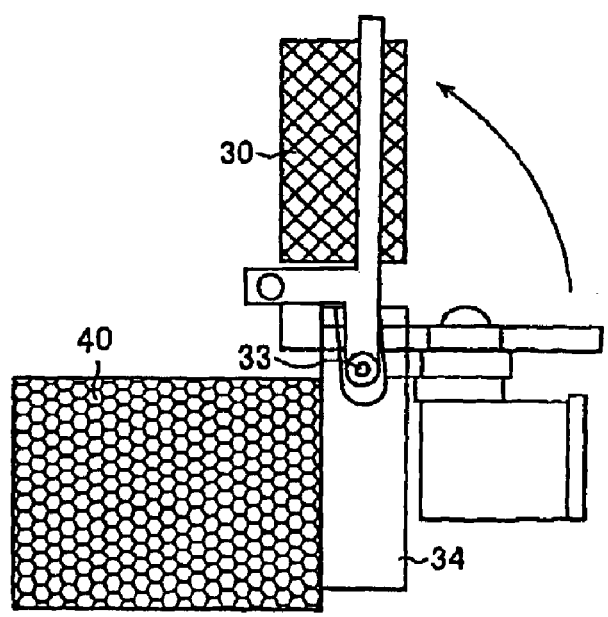
FIG. 8b is a view showing a state where the basket is rotated by about 90 degrees.

Next, when the Y-axis is moved from the state shown in FIG. 7 to the direction to promote the rotation (here in the negative Y-direction (to the left on the paper in FIG. 7)), the bearing 33 is moved while being constrained in and guided by the slot 35. As a result, a moment exerting in the direction around the axis of the rotary support shaft 36 is applied to the extension portion 32 of the support bar 31, and the support bar 31 starts to rotate around the rotary support shaft 36 in unison with the cutoff piece receiving basket 30. FIGS. 8a and 8b show states where the cutoff piece receiving basket 30 rotates for about 60 degrees and about 90 degrees, respectively.

Figure 9:
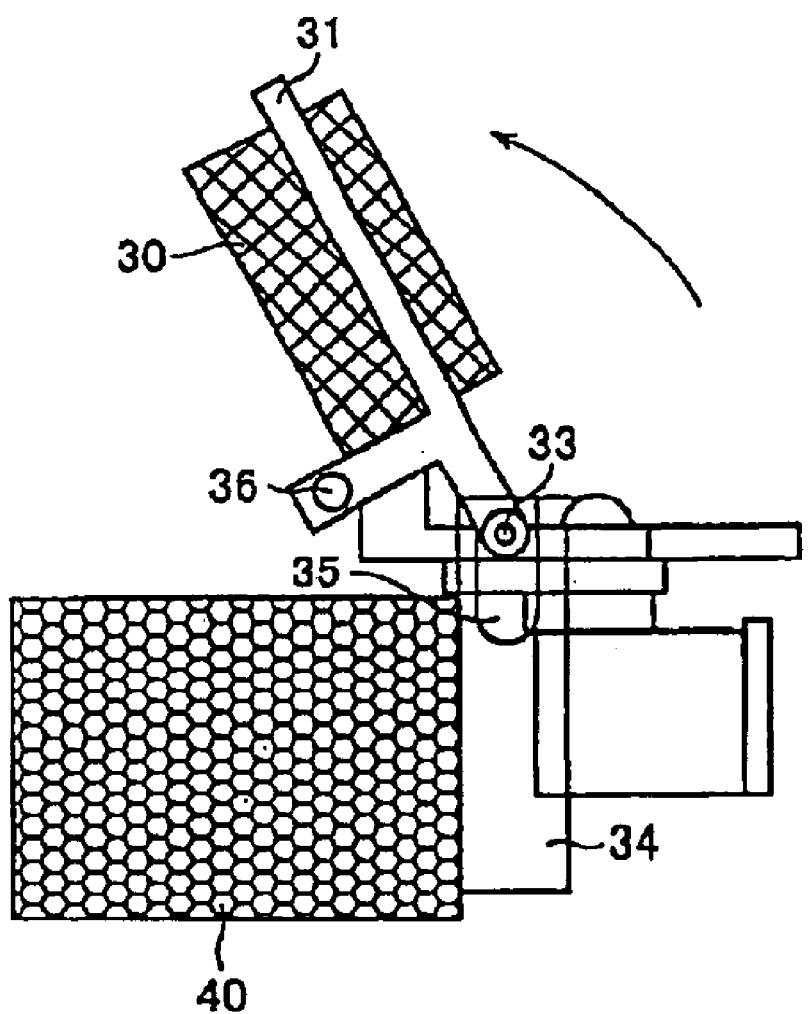
FIG. 9 is a view for explaining a state where the cutoff piece receiving basket of the embodiment is at its turnover position.

Then, the Y-axis is further moved, so that the cutoff piece receiving basket 30 is rotated to become a turnover state above the cutoff piece collecting box 40. The turnover state is shown in FIG. 9. In this example, the rotation limit is reached when the cutoff piece receiving basket 30 is rotated for about 120 degrees. This state is maintained for a predetermined time period, whereby the cutoff piece 2 is transferred from the cutoff piece receiving basket 30 to the cutoff piece collecting box 40.

For convenience of explanation, the XY position corresponding to the state shown in FIG. 9 will be referred to as "cutoff piece receiving basket turnover position."

Figure 10:
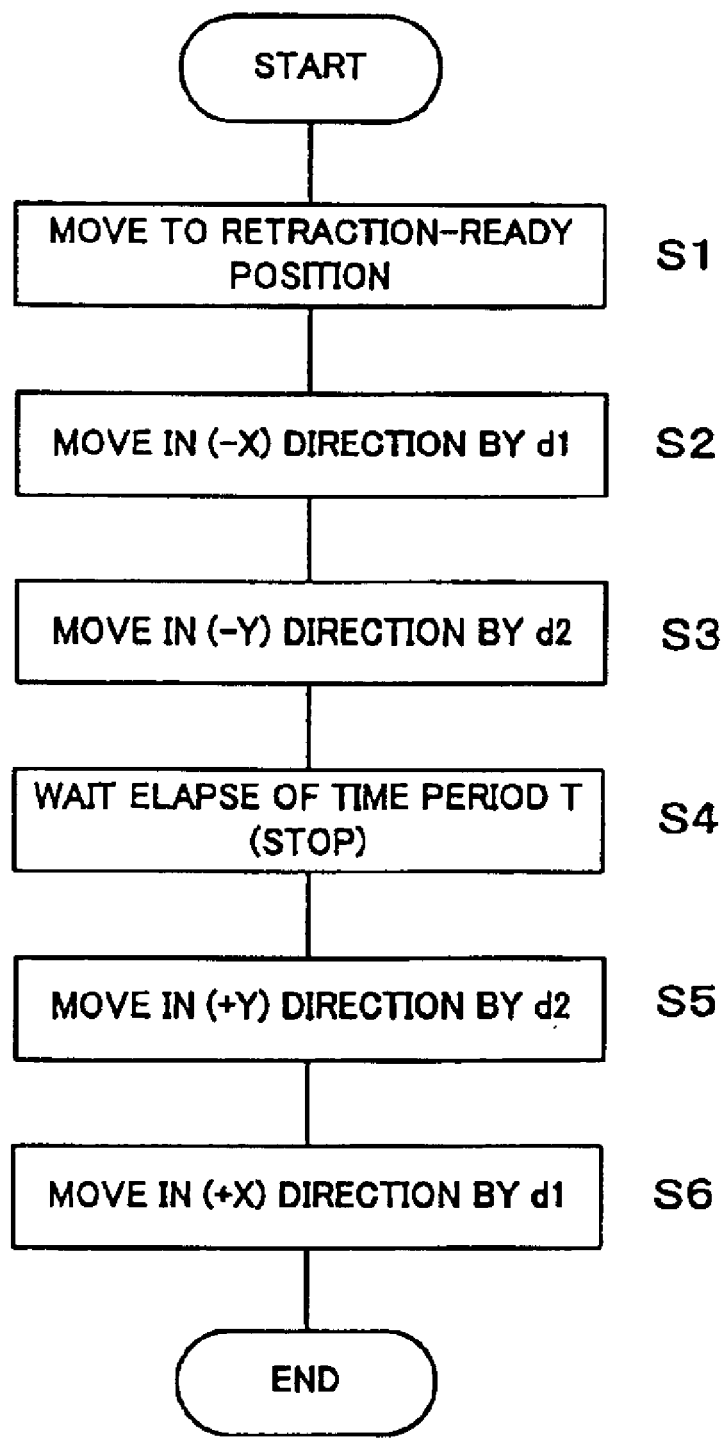
FIG. 10 is a flowchart collectively showing processes from start to end of a retraction/collection operation for the cutoff piece receiving basket.

After elapse of the predetermined time period, the Y-axis is moved opposite to the direction of the retracting operation, so that the Y-axis is restored from the state of FIG. 9 by way of the states of FIGS. 8b and 8a to the state of FIG. 7 (retraction start/completion position). When a return from there to the state of FIG. 5 (retraction-ready position) is made, engagement between the bearing 33 and the slot 35 is released, whereby the XY table becomes freely movable, with the cutoff piece receiving basket 30 kept stationary in its ordinary orientation (unrotatable state). The above-mentioned series of operations are collectively shown in the flowchart of FIG. 10. The following are the main points of respective steps.

Step S1: The X and Y axes are moved to the retraction-ready position that is preset beforehand in the controller.

Step S2: The X-axis is moved by a predetermined distance d1 in the negative X-direction. The predetermined distance d1 is a distance necessary and sufficient for the bearing 33 to be fully fitted into the slot 35 from the position shown in FIG. 5, the distance d1 being set beforehand in the controller.

Step S3: The Y-axis is moved by a predetermined distance d2 in the negative Y-direction. The predetermined distance d2 is a moving distance of the Y-axis that is necessary and sufficient for the cutoff piece receiving basket 30 to be rotated from the state (retraction start/completion position) shown in FIG. 7 to the state (cutoff piece receiving basket turnover position) shown in FIG. 9, the distance d2 being set beforehand in the controller.

Step S4: The cutoff piece receiving basket 30 is kept stopped for a predetermined time period T which is a period of time (several seconds, for instance) necessary and sufficient for the cutoff piece 2 to be ensured to fall from the cutoff piece receiving basket 30 to the cutoff piece collecting box 40, the time period T being set beforehand in the controller.

Step S5: The Y-axis is moved by the predetermined distance d2 in the positive Y-direction so as to be restored to the state (retraction start/completion position) shown in FIG. 7.

Step S6: The X-axis is moved by the predetermined distance d1 in the positive X-direction so as to be returned to the state (retraction-ready position) shown in FIG. 5.

The just-mentioned embodiment is advantageous in that neither an air cylinder nor a special-purpose motor is required since a rotary drive force required for the cutoff piece receiving basket to effect cutoff piece retraction/collection is obtainable from workpiece table drive axes that are originally equipped in the wire electric discharge machine, and in that the embodiment is hardly affected by sludge produced during the machining and hence highly reliable in operation. A further advantage is that fabrication costs are extremely low as a whole.

This invention is not limited to the foregoing embodiment. For example, a concrete mechanism (moment application source) for obtaining the rotary drive force for the cutoff piece receiving basket from the drive axes (X, Y, Z, C axes, etc.) of the machine may be other than that explained in the embodiment. As the moment application source, a motor other than axis-servomotors, a rotary actuator, an air cylinder, a robot, or human power may be used. Such examples are shown in FIGS. 11–14.

Figure 11:
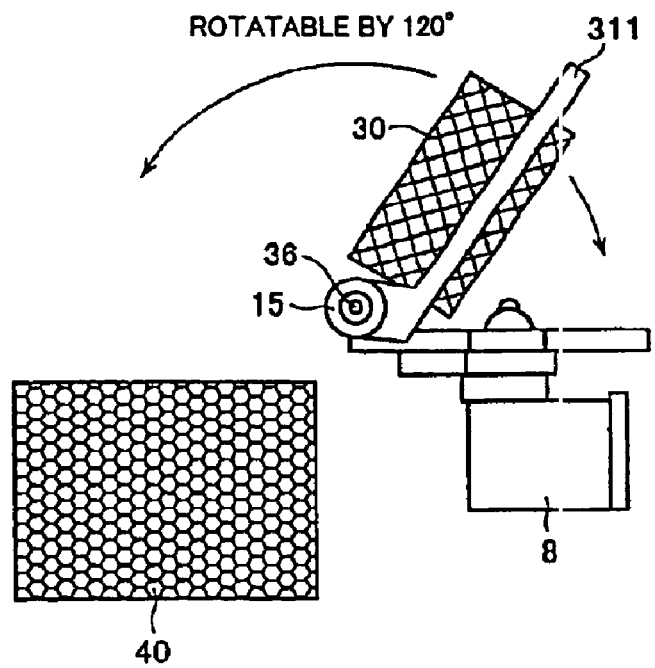
FIG. 11 is a view for explaining an example where a motor or a rotary actuator is used as a source for applying a moment to rotate the cutoff piece receiving basket.

FIG. 11 shows an example using a special-purpose motor or a rotary actuator. In this example, as a support member that supports the cutoff piece receiving basket 30, a support bar 311 is used instead of the support bar 31 used in the embodiment. The support bar is provided with neither a bearing nor an extension portion to which a moment is applied. Instead, a motor or rotary actuator 15 is provided that rotatably drives the rotary support shaft 36 by which the support bar 311 is supported for rotation. The motor or rotary actuator 15 may be installed so as to form one end (on the side of the rotary support shaft 36) of the support bar 311 or to form part (near the rotary support shaft 36) of the lower guide block 8.

To perform an operation of retraction/collection for the cutoff piece receiving basket 30, the rotary support shaft 36 may be rotatably driven in the order of rotation (anticlockwise in FIG. 11) for a predetermined angle (120 degrees, for instance) equal to or larger than 90 degrees, stoppage for a predetermined time period (several seconds, for instance) to cause the cutoff piece to fall into the cutoff piece collecting box 40, and reverse rotation (clockwise in FIG. 11) for the same predetermined angle. Control for the operation can be made using the controller (refer to FIG. 6) of the electrical equipment section 10.

Figure 12:
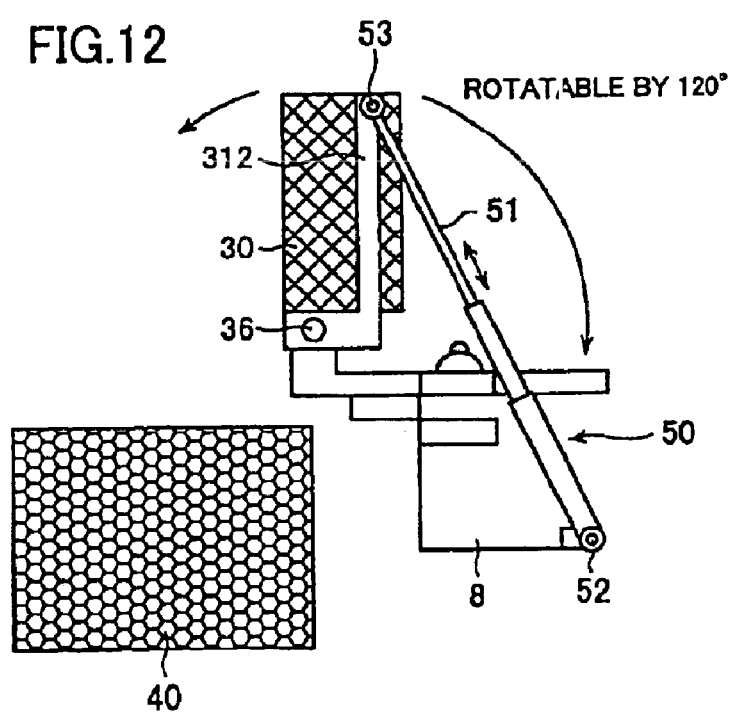
FIG. 12 is a view for explaining an example where an air cylinder is used as a source for applying a moment to rotate the cutoff piece receiving basket.

FIG. 12 shows an example using an air cylinder. In this next example, as a support member that supports the cutoff piece receiving basket 30, a support bar 312 is used instead of the support bar 31 used in the foregoing embodiment. The support bar 312 is provided at its one end (on the side remote from the rotary support shaft 36) with a pivotal support 53 for pivotally supporting a distal end portion of a movable rod 51 of an air cylinder 50. A pivotal support 52 for supporting a proximal portion of the air cylinder 50 is provided in the lower guide block 8. The location at which the pivotal support 52 is provided is determined in such a manner that the cutoff piece receiving basket 30 is at its ordinary orientation (unrotated orientation) when the air cylinder 50 is not activated (when the movable rod 51 is at its most retracted position).

To perform an operation of retraction/collection for the cutoff piece receiving basket 30, the air cylinder 50 is controlled in the order that: the air cylinder is activated to move the movable rod 51 forward, thereby rotating the cutoff piece receiving basket 30 (anticlockwise in FIG. 12) for a predetermined angle (120 degrees, for instance) equal to or larger than 90 degrees from a state where the cutoff piece receiving basket 30 is at its ordinary orientation (with its opening directed right above); the cutoff piece receiving basket 30 is kept in a standby state for a predetermined time period (several seconds, for instance) to cause the cutoff piece to fall into the cutoff piece collecting box 40; and the movable rod portion 51 is moved backward so that the cutoff piece receiving basket 30 is reversely rotated (clockwise in FIG. 12) for the same predetermined angle, to be restored to the ordinary orientation. Control for the operation can be made using the controller (refer to FIG. 6) of the electrical equipment section 10.

Figure 13:
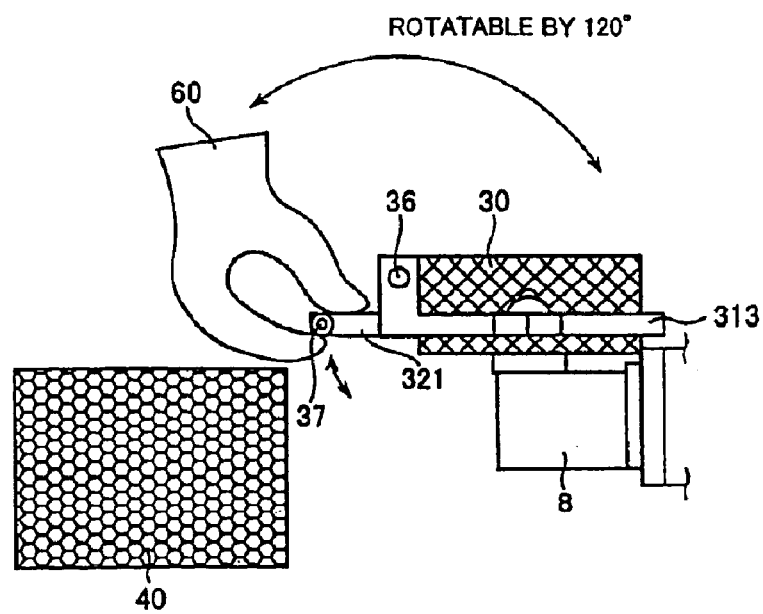
FIG. 13 is a view for explaining an example where human power is used as a source for applying a moment to rotate the cutoff piece receiving basket.

FIG. 13 shows an example causing the cutoff piece receiving basket 30 to rotate using human power. In this example, as a support member that supports the cutoff piece receiving basket 30, a support bar 313 is used instead of the support bar 31 used in the foregoing embodiment. The support bar 313 has an extension portion 321 corresponding to the aforesaid extension portion 32 (refer to FIG. 5), and an operation handle 37 operated by a human hand 60 is provided in the vicinity of a distal end of the extension portion 321.

To perform an operation of retraction/collection for the cutoff piece receiving basket 30, the handle is operated in the order that: an operator grasps the handle 37 by the hand 60, with the cutoff piece receiving basket 30 placed at its ordinary orientation (with its opening directed right above), and operates the handle 37 to rotate the cutoff piece receiving basket 30 (anticlockwise in FIG. 13) for a predetermined angle (120 degrees, for instance) equal to or larger than 90 degrees; the cutoff piece receiving basket 30 is kept in a standby state for a predetermined time period (several seconds, for instance) to cause the cutoff piece to fall into the cutoff piece collecting box 40; and the handle 37 is moved back so that the cutoff piece receiving basket 30 is reversely rotated (clockwise in FIG. 13) for the same predetermined angle, to be restored to the ordinary orientation. Since the handle 37 projects toward the front of the paper in FIG. 13 by an appropriate length, there is no fear that the human hand 60 is pinched between the handle 37 and the cutoff piece collecting box 40.

Figure 14:
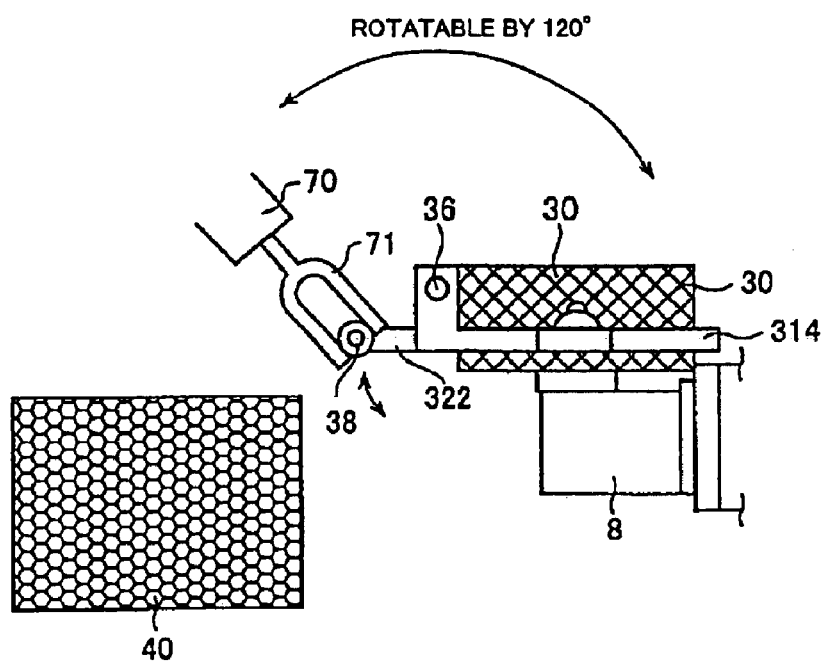
FIG. 14 is a view for explaining an example where a robot is used as a source for applying a moment to rotate the cutoff piece receiving basket.

FIG. 14 shows an example where a robot is used instead of human power as a moment application source. In this example, as a support member that supports the cutoff piece receiving basket 30, a support bar 314 is used instead of the support bar 31 used in the foregoing embodiment. The support bar 314 has an extension portion 322 corresponding to the aforesaid extension portion 321, and an operation handle 38 operated by a robot hand 71 attached to a robot 70 is provided in the vicinity of a distal end of the extension portion 322.

To perform an operation of retraction/collection for the cutoff piece receiving basket 30, the robot 70 is operated in the order that: the handle 38 is grasped by the robot hand 71, with the cutoff piece receiving basket 30 placed at its ordinary orientation (with its opening directed right above), and is operated to rotate the cutoff piece receiving basket 30 (anticlockwise in FIG. 14) for a predetermined angle (120 degrees, for instance) equal to or larger than 90 degrees; the cutoff piece receiving basket 30 is kept in a standby state for a predetermined time period (several seconds, for instance) to cause the cutoff piece to fall into the cutoff piece collecting box 40; and the handle 38 is moved back so that the cutoff piece receiving basket 30 is reversely rotated (clockwise in FIG. 14) for the same predetermined angle and restored to the ordinary orientation. Since the handle 38 projects toward the front of the paper in FIG. 14 by an appropriate length, there is no fear that interference occurs such that the robot hand 71 is pinched between the handle 37 and the cutoff piece collecting box 40.

According to this invention, there is provided a wire electric discharge machine having a mechanism for retracting a cutoff piece machined chip or machined product) from a position where it can interfere with a lower arm, lower guide, etc., and for collecting the cutoff piece. The mechanism is simple and easy to perform an automated retracting operation.

What is claimed is:

1. A wire electric discharge machine for performing electric discharge machining by electric discharge between a wire electrode and a workpiece, comprising:
    a lower guide arranged below the workpiece for guiding the wire electrode;
    a cutoff piece receiving basket provided at said lower guide for receiving a cutoff piece produced by the electric discharge machining;
    supporting means for pivotally supporting said cutoff piece receiving basket around a horizontal axis;
    turning means for turning said cutoff piece receiving basket supported by the supporting means around the horizontal axis; and
    a cutoff piece collecting box for receiving and collecting the cutoff piece displaced from said cutoff piece receiving basket by the turning of said cutoff piece receiving basket by said turning means.

2. A wire electric discharge machine according to claim 1, wherein said turning means includes driving means for moving the workpiece placed in a machining tank relative to the wire electrode.

3. A wire electric discharge machine according to claim 2, wherein said turning means includes a cam block fixed to the machining tank, said supporting means includes a support member for supporting said cutoff piece receiving basket and having one end to be engaged with said cam block, and said cam block is moved relative to said lower guide to be engaged with the one end of said support member and moved toward or away from said lower guide by said driving means, so that said cutoff piece receiving basket is turned around the horizontal axis.

4. A wire electric discharge machine according to claim 1, wherein said turning means includes a motor or a rotary actuator.

5. A wire electric discharge machine according to claim 1, wherein said turning means includes an air cylinder.

6. A wire electric discharge machine according to claim 1, wherein the cutoff piece is a machined chip.

7. A wire electric discharge machine according to claim 1, wherein the cutoff piece is a machined product.

8. A wire electric discharge machine for performing electric discharge machining by electric discharge between a wire electrode and a workpiece, comprising:

a lower guide arranged below the workpiece for guiding the wire electrode;

a cutoff piece receiving basket provided at said lower guide for receiving a cutoff piece produced by the electric discharge machining;

supporting means for pivotally supporting said cutoff piece receiving basket around a horizontal axis;

a rotary operating member for receiving a moment to turn said cutoff piece receiving basket around the horizontal axis; and a cutoff piece collecting box for receiving and collecting the cutoff piece displaced from said cutoff piece receiving basket by the turning of said rotary operating member by the moment applied to said rotary operating member.

9. A wire electric discharge machine according to claim 8, wherein the moment to turn said rotary operating member is manually applied.

10. A wire electric discharge machine according to claim 8, wherein the moment to turn said rotary operating member is applied by a tool attached to a robot.

11. A wire electric discharge machine according to claim 8, wherein the cutoff piece is a machined chip.

12. A wire electric discharge machine according to claim 8, wherein the cutoff piece is a machined product.

* * * * *

UNITED STATES PATENT AND TRADEMARK OFFICE
CERTIFICATE OF CORRECTION

PATENT NO. : 6,884,957 B2
DATED : April 26, 2005
INVENTOR(S) : Yuki Kita et al.

It is certified that error appears in the above-identified patent and that said Letters Patent is hereby corrected as shown below:

Column 8,
Line 34, before "machined" insert -- ( --.

Signed and Sealed this

Twenty-seventh Day of December, 2005

JON W. DUDAS
*Director of the United States Patent and Trademark Office*